(12) United States Patent  
McCarthy et al.

(10) Patent No.: US 9,100,056 B2  
(45) Date of Patent: Aug. 4, 2015

(54) WAVEGUIDE STRUCTURE FOR A CONTACTLESS CONNECTOR

(75) Inventors: Sean Patrick McCarthy, Palmyra, PA (US); Steven Alan Jarrett, Hummelstown, PA (US); Bruce Foster Bishop, Aptos, CA (US); Robert Daniel Hilty, Harrisburg, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 420 days.

(21) Appl. No.: 13/585,341

(22) Filed: Aug. 14, 2012

(65) Prior Publication Data

US 2013/0181791 A1    Jul. 18, 2013

Related U.S. Application Data

(60) Provisional application No. 61/587,972, filed on Jan. 18, 2012.

(51) Int. Cl.  
*H01P 1/06* (2006.01)  
*H04B 5/00* (2006.01)  
*H01Q 13/02* (2006.01)  
*H01Q 1/22* (2006.01)

(52) U.S. Cl.  
CPC .............. *H04B 5/0031* (2013.01); *H01P 1/06* (2013.01); *H01Q 13/02* (2013.01); *H01Q 1/2283* (2013.01)

(58) Field of Classification Search  
CPC .......................................................... H01P 1/06  
USPC ........................................ 333/21 R, 261, 21 A  
See application file for complete search history.

(56) References Cited

U.S. PATENT DOCUMENTS

| 6,693,598 | B1 * | 2/2004 | Bishop et al. ................. 343/741 |
| 2007/0115077 | A1 | 5/2007 | Chan |
| 2007/0229270 | A1 | 10/2007 | Rofougaran |
| 2011/0063053 | A1 | 3/2011 | Guler |
| 2011/0215985 | A1 * | 9/2011 | Kaplan et al. ................. 343/879 |
| 2011/0230136 | A1 | 9/2011 | Washiro |
| 2012/0182094 | A1 * | 7/2012 | Kawamura ..................... 333/239 |

FOREIGN PATENT DOCUMENTS

JP         2011188185 A         9/2011

OTHER PUBLICATIONS

International Search Report issued in related PCT application No. PCT/US2012/070312 dated Apr. 5, 2013.

* cited by examiner

*Primary Examiner* — Stephen E Jones

(57) ABSTRACT

A contactless connector includes a first communication chip configured to at least one of transmit and receive wireless RF signals, a second communication chip configured to at least one of transmit and receive wireless RF signals, and a waveguide structure between the first and second communication chips. The waveguide structure conveys RF signals between the first and second communication chips.

20 Claims, 3 Drawing Sheets

WAVEGUIDE STRUCTURE FOR A CONTACTLESS CONNECTOR

CROSS REFERENCE TO RELATED APPLICATIONS

This application claims the benefit of U.S. Provisional Application No. 61/587,972 filed Jan. 18, 2012, the subject matter of which is herein incorporated by reference in its entirety.

This application discloses subject matter that relates to subject matter described in U.S. patent application Ser. No. 13/336,705 filed Dec. 23, 2011, titled CONTACTLESS CONNECTOR, the subject matter of which is herein incorporated by reference in its entirety.

BACKGROUND OF THE INVENTION

The subject matter herein relates generally to contactless connectors that provide contactless data transmission at short range using RF energy and waveguide structures for such contactless connectors.

Contactless connectors typically include a transmitter chip and a receiver chip. A data stream is furnished to the transmitter chip, which produces a modulated RF signal, such as at 60 GHz. That signal is propagated a short distance to the receiver chip, which demodulates the signal and recovers the original data stream. The chips have antennas to allow transmission of data between the connector pairs without the need for an electrical or optical connection. Multiple channels can be provided by using multiple transmitter chip and receiver chip pairs. To avoid crosstalk between channels, each chip pair is isolated from a neighboring pair by distance or by shielding.

Certain applications require spacing of the transmitter and receiver chips at distances that are too far for effective transmission by the chips. Additionally, certain applications require relative motion between the connector components. While the chips can be separated longitudinally within certain limits with little or no degradation in performance, beyond such limits the signal and performance are diminished. Separation allows reduced precision in the mated position of the connector carriers or even some compliance to allow for mismatch in the position of the connector carriers. Problems arise when complex translation is required. For example, translation in more than one direction is problematic and leads to signal degradation and/or transmission failure.

A need remains for a contactless connector that accommodates for adequate spacing and/or movement of the connector components.

BRIEF DESCRIPTION OF THE INVENTION

In one embodiment, a contactless connector is provided having a first communication chip configured to at least one of transmit and receive wireless RF signals, a second communication chip configured to at least one of transmit and receive wireless RF signals, and a waveguide structure between the first and second communication chips. The waveguide structure conveys RF signals between the first and second communication chips.

Optionally, the waveguide structure may include a waveguide, a first waveguide module at one end of the waveguide and a second waveguide module at an opposite end of the waveguide. The waveguide structure may include at least one passive component. Optionally, the passive component may enhance the communication link between the first and second communication chips. The passive component may redirect the RF signal. The passive component may collect the RF signal. The passive component may reflect the RF signal in a general direction. The passive component may extend the propagation distance of the RF signal. The passive component may change the propagation direction of the RF signal, change the propagation mode of the RF signal, change the polarization of the RF signal and/or combines multiple modes of RF signals. The passive component and/or the waveguide may shield the RF signal from interfering signals.

Optionally, the waveguide structure may include a horn antenna that collects and directs the RF signals. The waveguide structure may include a mode converter that changes the propagation mode of the RF signal and/or changes the polarization of the RF signal and/or combines multiple modes of RF signals. The waveguide may have a rotary joint that allows rotary motion between the first communication chip and the second communication chip.

In another embodiment, a waveguide structure for a contactless connector is provided having a first waveguide module having a passive component configured to receive a wireless RF transmission from a first communication chip. The passive component conveys a first signal therefrom. The waveguide structure includes a waveguide having a waveguide body extending between a first end and a second end. The waveguide receives the first signal from the passive component of the first waveguide module and conveying the first signal to the second end. The waveguide structure includes a second waveguide module having a passive component receiving the first signal from the waveguide. The passive component wirelessly conveying the first signal to a second communication chip.

In a further embodiment, a contactless connector is provided having a communication module including a communication chip generating a RF signal and wirelessly transmitting the RF signal. A first waveguide module is adjacent the communication chip. The first waveguide module has a passive component receiving the RF signal and conveying the RF signal along a transmission path. A waveguide is adjacent the first waveguide module. The waveguide receives the RF signal and conveys the RF signal along the waveguide remote from the first waveguide module.

DETAILED DESCRIPTION OF THE INVENTION

Figure 1:
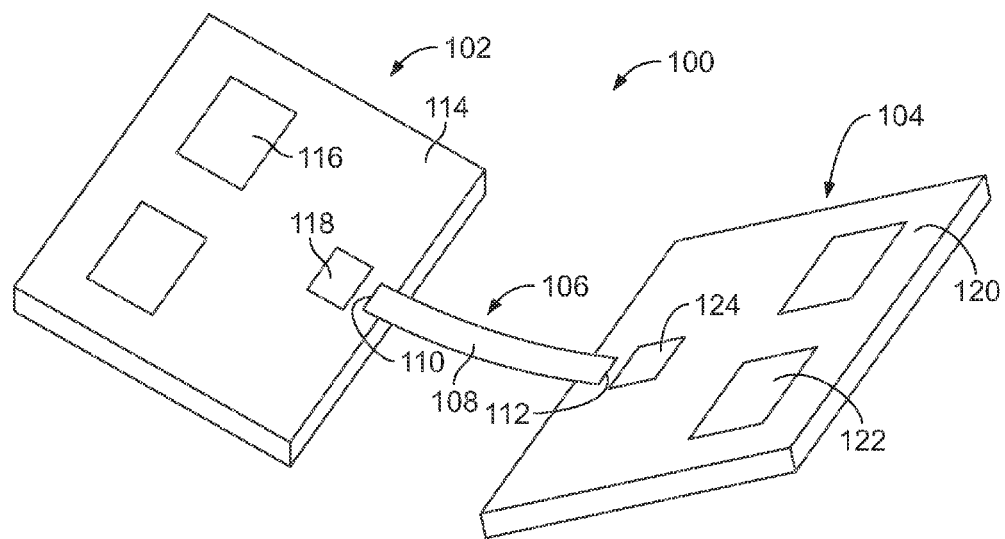
FIG. 1 illustrates a contactless connector formed in accordance with an exemplary embodiment.

Embodiments described herein provide a contactless connector having two modules that form a data link. A waveguide structure is provided that connects the two modules for guiding and shielding the data link. The waveguide structure directs the energy along a particular path to enhance the communication link between the two modules. The modules may include RF transmitters and receivers, which may be chips, for the purpose of communicating wirelessly with similar chips and transmitter/receivers. The transmission and reception of RF signals to and from these chips is dependent on the relative position of the chips as well as the positions and orientation of the waveguide structure and/or the transmitters, receivers, antenna structures, groundplanes and other structures contained within the contactless connector.

Embodiments described herein provide a waveguide structure that is external to the chips. The waveguide structure may be used to collect, re-direct, extend the propagation distance, change the propagation direction, change the propagation mode, change the polarization, combine multiple modes, shield the transmitted/received signals from interfering signals, and the like.

Embodiments described herein provide a waveguide structure that may be manufactured from a number of different materials including dielectric materials, dielectric materials with metallized surfaces, metal plates and tubes, conductive plastics, hollow metal guides, air and the like. The waveguide structure may contain antennas, horns or other structures for collecting the signals. The waveguide structure may include a waveguide for directing and extending the length of propagation of the signal path. The waveguide structure may include a mode converter for changing the waveguide mode and/or the polarization. The waveguide structure may include a mode coupling structure for combining multiple waveguide modes from/to multiple transmitters/receivers. The waveguide structure may include a metal shield to protect the signal from interference. The waveguide structure may be cylindrical in shape, rectangular in shape or have another shape.

Embodiments described herein may include a rotary joint in the waveguide structure between the two modules. The use of axisymmetric EM modes may make the signal strength independent of the relative angle of rotation between the first module and the second module. The waveguide structure may have one or more gaps or breaks, and the gap(s) may be made of a material that differs from the waveguide material. For example, a plastic waveguide may have a gap which contains air, water, flesh, vacuum, glass or other non-metal. The waveguide may increase the allowable separation distance between the RF-based chips by reducing the divergence of the RF signal emitted by the first chip and maintaining an acceptable level of signal strength at the receiving chip. The waveguide may reject sources of external noise and improve the signal-to-noise ratio of the system for a given separation distance.

Embodiments described herein may include modules having only a single transmission line. For example, the first module could contain a single transmit-only chip and the second module could contain a single receive-only chip to form a unidirectional single-channel communication channel. In other embodiments, both modules could contain a single transmit-receive chip, with each chip set to a fixed function (e.g. transmit or receive) to form a unidirectional single-channel communication channel. The direction of the communication channel could be set at will by reversing the function of each of the two chips. In other embodiments, both modules could contain a single transmit-receive chip. Embodiments described herein may include modules having multiple transmission lines. For example, the system can consist of modules having two or more RF-based chip sets. Embodiments may provide the first module with two transmit chips and the second module with two receive chips for a two-channel, single-direction system. Other embodiments may provide one transmit chip and one receive chip in each module to form a two-channel bidirectional system (e.g. full duplex communication). Other embodiments may have multiple transmit-receive chips.

FIG. 1 illustrates a contactless connector 100 formed in accordance with an exemplary embodiment. The connector 100 includes a first module 102 and a second module 104 that provides contactless data transmission at short range using RF energy. A propagation path is defined between the first and second modules 102, 104 and provides a defined transmission path for the RF energy between the first and second modules 102, 104. In an exemplary embodiment, the propagation path includes a waveguide structure 106 that guides the RF energy along a predetermined path between the first and second modules 102, 104. The waveguide structure 106 may extend along only part of the path between the first and second modules 102, 104. The waveguide structure 106 may be any type of propagation path, including an air gap between the first and second modules 102, 104. The waveguide structure 106 may be non-continuous and may span across different interfaces and/or materials.

In the illustrated embodiment, the waveguide structure 106 is defined by a waveguide 108 that extends between a first end 110 and a second end 112. The first and second ends 110, 112 are positioned adjacent the first and second modules 102, 104. Optionally, the waveguide 108 may have a rotary joint that allows relative rotation and/or linear translation at the joint.

In an exemplary embodiment, the first module 102 defines a transmitter (and/or a receiver) and the second module 104 defines a receiver (and/or a transmitter) for receiving the RF energy emitted by the transmitter. The first module 102 may be referred to hereinafter as a transmitter 102. The second module 104 may be referred to hereinafter as a receiver 104. In an alternative embodiment, the first module 102 defines a receiver and the second module 104 defines a transmitter. Optionally, the first module 102 may define both a transmitter and a receiver and the second module 104 may define both a transmitter and a receiver. The first and second modules 102, 104 may allow single directional communication or may allow bi-directional communication.

In an exemplary embodiment, the connector 100 may allow duplex communication between the first module 102 and the second module 104. Multiple transmit and receive pairs may produce multiple communication channels through the waveguide structure 106 between the first module 102 and the second module 104. Each channel may use a distinct and separable polarization mode to provide isolation between the RF signals of the various communication channels.

In an exemplary embodiment, the first module 102 includes a circuit board 114 having one or more electrical components 116 thereon. The first module 102 includes a first communication chip 118 that emits RF signals. The first module 102 may have more than one communication chip and the communication chip may define a transmitter chip, a receiver chip or a transceiver chip that is able to both transmit and receive. The second module 104 includes a circuit board 120 having one or more electrical components 122 thereon. The second module 104 includes a second communication chip 124 that receives RF signals. The second module 104 may have more than one communication chip and the communication chip may define a transmitter chip, a receiver chip or a transceiver chip that is able to both transmit and receive. The chips 118, 124 may have an antenna for transmitting/receiving the RF signals. The antenna may be integrated into the chip or may be a separate component connected to the chip.

The RF signals are emitted from the first module 102 into the waveguide structure 106 as RF energy. The waveguide structure 106 conveys the RF signals to the second module 104. The first module 102 sends the signals as RF data transmissions and the waveguide structure 106 conveys the RF data transmissions to the second module 104. The second module 104 receives the RF data transmissions from the waveguide structure 106 and recovers the RF data transmissions. In an exemplary embodiment, multiple RF data transmissions may be conveyed by the waveguide structure 106 having different propagation modes allowing such signals to be conveyed in the same space and allowing such signals to be separable.

Figure 2:
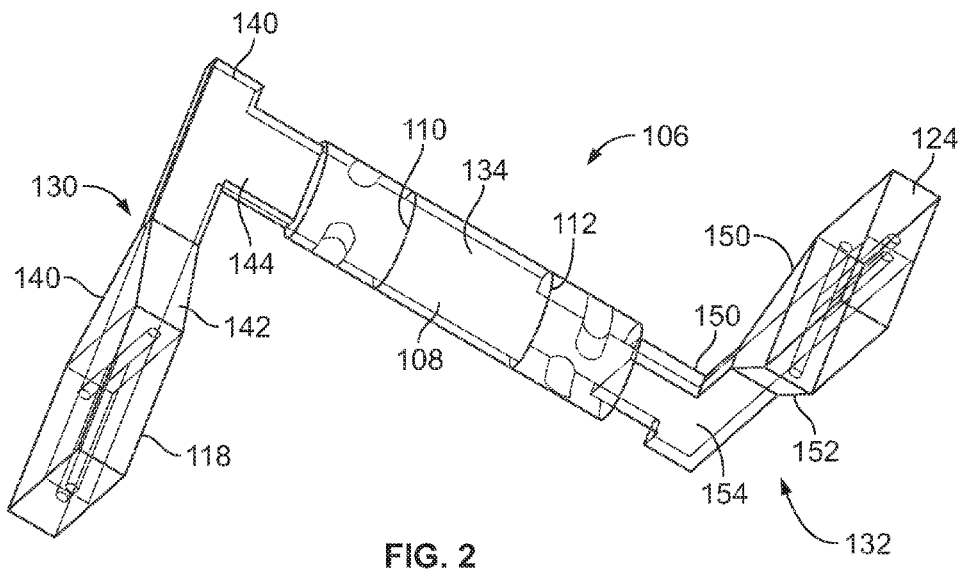
FIG. 2 illustrates the contactless connector.

FIG. 2 illustrates the contactless connector 100 showing the waveguide structure 106 between the first and second communication chips 118, 124 of the first and second modules 102, 104. The circuit boards 114, 120 (shown in FIG. 1) are removed for clarity.

The waveguide structure 106 includes the waveguide 108, a first waveguide module 130 at the first end 110 of the waveguide 108 and a second waveguide module 132 at the second end 112 of the waveguide 108. The first and second waveguide modules 130, 132 direct the RF signals from/to the chips 118, 124 and from/to the waveguide 108. The waveguide structure 106 may be used without waveguide modules at one or both ends of the waveguide 108 in alternative embodiments.

The waveguide 108 has a waveguide body 134 extending between the first end 110 and the second end 112. The waveguide 108 facilitates longer pathlength communication by directing the RF signals along a predetermined path. Optionally, the waveguide body 134 may provide shielding from interfering signals. The waveguide body 134 may be a hollow metal tube, such as a copper tube. The waveguide body 134 may be a plastic, ceramic, glass or other body. The waveguide body 134 may be manufactured from multiple pieces. The pieces may be movable relative to one another. The waveguide body 134 may be cylindrical or may have other shapes in alternative embodiments. The waveguide body 134 may extend along a longitudinal axis or may extend along a curved or angled path.

The first waveguide module 130 has one or more passive components 140 between the first communication chip 118 and the waveguide 108. The passive components 140 receive the wireless RF transmission from the first communication chip 118 and convey the RF signal to the waveguide 108. Optionally, the passive components 140 may be integral with each other. Optionally, the passive components 140 may be integral with the waveguide 108. For example, the passive components 140 may be co-molded, extruded, machined or otherwise formed simultaneously with one another and/or the waveguide 108. In alternative embodiments, the passive components 140 may be separate from one another and/or the waveguide 108. In such embodiments, the passive components 140 may be positioned adjacent one another and/or the waveguide 108. The passive components 140 may abut against one another and/or the waveguide 108. The passive components 140 may be positioned proximate to one another and/or the waveguide 108.

The passive components 140 enhance the communication link between the first and second communication chips 118, 124. The passive components 140 may have desired characteristics to affect the RF signals in a particular way to enhance the RF signals. For example, the passive components 140 may be used to collect the RF signals from the first communication chip 118. The passive components 140 may be used to redirect the RF signals along a predetermined path or in a certain direction. The passive components 140 may be used to extend the propagation distance of the RF signals. For example, the passive components 140 may maintain the signal at a sufficient strength at a detectable level for a longer distance than without the passive components 140. The passive components 140 may be used to change the propagation direction of the RF signals. The passive components 140 may be used to change the propagation mode of the RF signals. The passive components 140 may be used to change the polarization of the RF signals. The passive components 140 may be used to combine (or extract) multiple modes of RF signals. The passive components 140 may be used to shield the RF signals from interfering signals.

In the illustrated embodiment, the passive components 140 comprise a horn antenna 142 used to collect the RF signals from the first communication chip 118. The horn antenna 142 directs the RF signals in a certain direction. The horn antenna 142 collects the transmitted signals to facilitate longer pathlength communication. The horn antenna 142 has a trapezoidal shape with the wider end facing the chip 118 and the narrower end facing the other passive components 140 and/or the waveguide 108. The horn antenna 142 may have other shapes in alternative embodiments. Other types of collectors/directors may be used in alternative embodiments, such as other types of antennas, a polarizer, a reflector or another structure. In the illustrated embodiment, the horn antenna 142 is oriented generally perpendicular to the waveguide 108, however other orientations are possible in alternative embodiments.

In the illustrated embodiment, the passive components 140 include a mode converter 144. The mode converter 144 provides a transformation of the electromagnetic energy from one propagation mode to another. The mode converter 144 may affect the E-field and/or the B-field of the signal. The mode converter 144 may change a direction of the propagation path. In the illustrated embodiment, the mode converter 144 includes a T-shaped portion and a can portion however other types of mode converters may be used in alternative embodiments. The mode converter 144 may facilitate polarization changes to allow for free rotation of the waveguide 108 about the longitudinal axis. For example, the mode converter 144 may be a septum polarizer. The mode converter 144 may facilitate mode coupling for combining multiple waveguide modes from/to multiple transmitters/receivers.

Optionally, the first waveguide module 130 may have one or more active components in addition to the passive components 140. The active components may include an amplifier, a filter, a mode converter or another type of active component to enhance, alter or otherwise affect the signal and/or operation of the first waveguide module 130.

The second waveguide module 132 has one or more passive components 150 between the second communication chip 124 and the waveguide 108. The passive components 150 receive the wireless RF transmission from the waveguide 108 and convey the RF signal to the second communication chip 124 (the direction may be reversed when the second waveguide module 132 operates as a transmitter). Optionally, the passive components 150 may be integral with each other. Optionally, the passive components 150 may be integral with the waveguide 108. For example, the passive components 150 may be co-molded, extruded, machined or otherwise formed simultaneously with one another and/or the waveguide 108. In alternative embodiments, the passive components 150 may be separate from one another and/or the waveguide 108. In such embodiments, the passive components 150 may be positioned adjacent one another and/or the waveguide 108. The passive components 150 may abut against one another and/or the waveguide 108. The passive components 150 may be positioned proximate to one another and/or the waveguide 108.

The passive components 150 enhance the communication link between the first and second communication chips 118, 124. The passive components 150 may have desired characteristics to affect the RF signals in a particular way to enhance the RF signals. For example, the passive components 150 may be used to direct the RF signals to the second communication chip 124. The passive components 150 may be used to re-direct the RF signals along a predetermined path or in a certain direction. The passive components 150 may be used to extend the propagation distance of the RF signals. For example, the passive components 150 may maintain the signal at a sufficient strength at a detectable level for a longer distance than without the passive components 150. The passive components 150 may be used to change the propagation direction of the RF signals. The passive components 150 may be used to change the propagation mode of the RF signals. The passive components 150 may be used to change the polarization of the RF signals. The passive components 150 may be used to extract (or combine) multiple modes of RF signals. The passive components 150 may be used to shield the RF signals from interfering signals.

In the illustrated embodiment, the passive components 150 comprise a horn antenna 152 used to direct the RF signals to the second communication chip 124. The horn antenna 152 directs the RF signals in a certain direction. The horn antenna 152 has a trapezoidal shape with the wider end facing the chip 124 and the narrower end facing the other passive components 150 and/or the waveguide 108. The horn antenna 152 may have other shapes in alternative embodiments. Other types of structures may be used in alternative embodiments, such as other types of antennas, a polarizer, a reflector or another structure. In the illustrated embodiment, the horn antenna 152 is oriented generally perpendicular to the waveguide 108, however other orientations are possible in alternative embodiments.

In the illustrated embodiment, the passive components 150 include a mode converter 154. The mode converter 154 provides a transformation of the electromagnetic energy from one propagation mode to another. The mode converter 154 may affect the E-field and/or the B-field of the signal. The mode converter 154 may change a direction of the propagation path. In the illustrated embodiment, the mode converter 154 includes a T-shaped portion and a can portion however other types of mode converters may be used in alternative embodiments. The mode converter 154 may facilitate polarization changes to allow for free rotation of the waveguide 108 about the longitudinal axis. For example, the mode converter 154 may be a septum polarizer. The mode converter 154 may facilitate mode coupling for combining multiple waveguide modes from/to multiple transmitters/receivers.

Optionally, the second waveguide module 132 may have one or more active components in addition to the passive components 150. The active components may include an amplifier, a filter, a mode converter or another type of active component to enhance, alter or otherwise affect the signal and/or operation of the second waveguide module 132.

Figure 3:
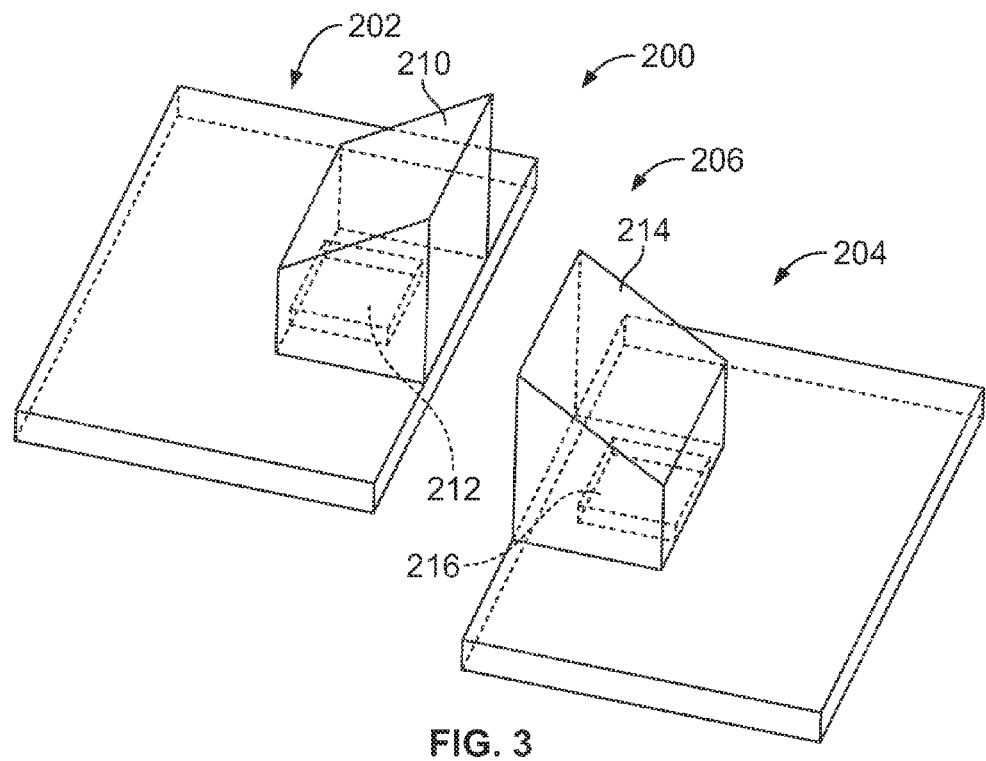
FIG. 3 illustrates a contactless connector formed in accordance with an exemplary embodiment.

FIG. 3 illustrates another contactless connector 200 formed in accordance with an exemplary embodiment. The connector 200 includes a first module 202 and a second module 204 that provides contactless data transmission at short range using RF energy. A propagation path is defined between the first and second modules 202, 204 and provides a defined transmission path for the RF energy between the first and second modules 202, 204. In an exemplary embodiment, the propagation path includes a waveguide structure 206 that guides the RF energy along a predetermined path between the first and second modules 202, 204.

The waveguide structure 206 includes a first reflector 210 covering a first communication chip 212 of the first module 202 and a second reflector 214 covering a second communication chip 216 of the second module 204. The reflectors 210, 214 direct the RF energy along the propagation path. The propagation path has an air gap forming part of the waveguide structure 206 between the first and second modules 202, 204. The air gap allows relative movement between the first and second modules 202, 204.

The reflectors 210, 214 direct the RF energy toward one another. The reflectors 210, 214 may include one or more metal or metalized surfaces that reflect the RF energy. The reflectors 210, 214 collect the RF signals and redirect the RF signals in a desired direction. The reflectors 210, 214 provide shielding from interfering signals. The reflectors 210, 214 are passive components that enhance the communication link between the first and second communication chips 212, 216. The reflectors are external structures to the first and second communication chips 212, 216. The reflectors 210, 214 have angled surfaces that direct the RF energy in an appropriate direction toward the other reflector 210, 214. The waveguide structure 206 is defined by the reflectors 210, 214 and the air gap therebetween.

Figure 4:
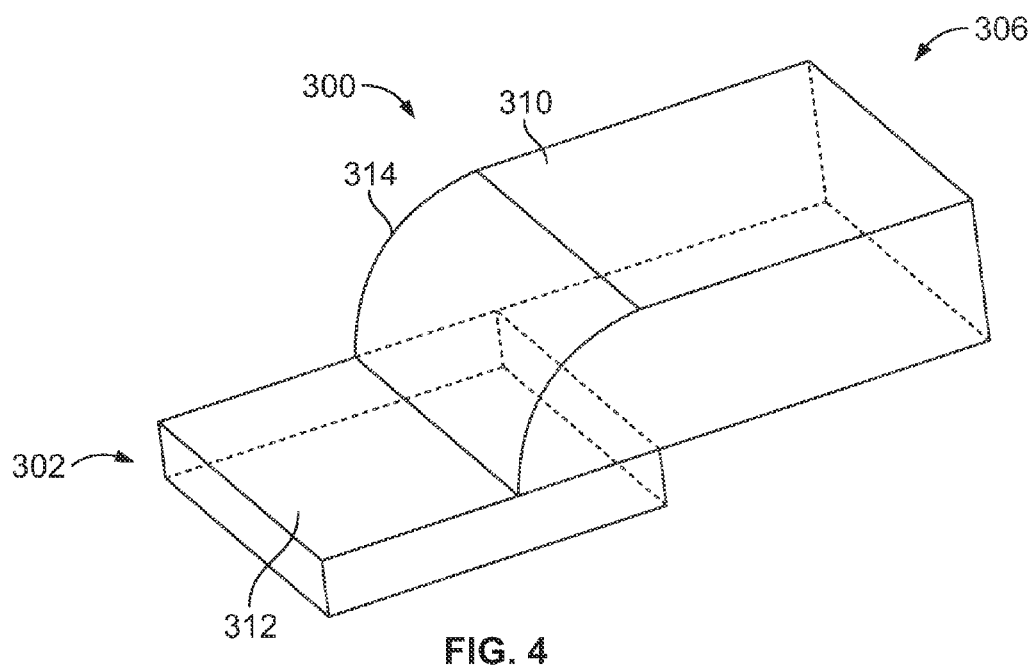
FIG. 4 illustrates a contactless connector formed in accordance with an exemplary embodiment.

FIG. 4 illustrates another contactless connector 300 formed in accordance with an exemplary embodiment. The connector 300 includes a first module 302 that provides contactless data transmission at short range using RF energy. A propagation path is defined by the first module 302 and provides a defined transmission path for the RF energy to and from the first module 302. In an exemplary embodiment, the propagation path includes a waveguide structure 306 that guides the RF energy along a predetermined path.

The waveguide structure 306 includes a reflector 310 provided proximate to a communication chip 312 of the first module 302. The reflector 310 directs the RF energy along the propagation path to and/or from the communication chip 312. The propagation path may have an air gap forming part of the waveguide structure 306.

The reflector 310 directs the RF energy generally in a desired direction. The reflector 310 has a curved surface 314 that changes the direction of the RF energy. The curved surface 314 is a reflective surface for the RF energy. The reflector 310 may include other reflective surface for the RF energy. The curved surface 314 may be defined by metalizing the outer surface of the reflector 310. The reflector 310 may provide shielding from interfering signals. The reflector 310 is a passive component that enhances the communication link.

Figure 5:
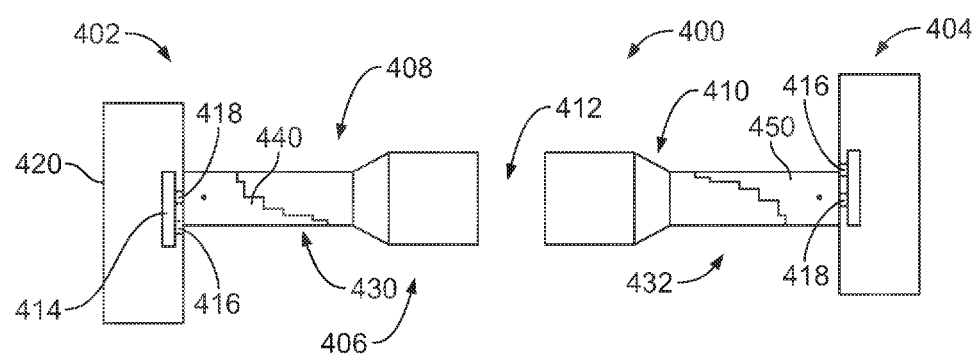
FIG. 5 illustrates a contactless connector formed in accordance with an exemplary embodiment.
Figure 6:
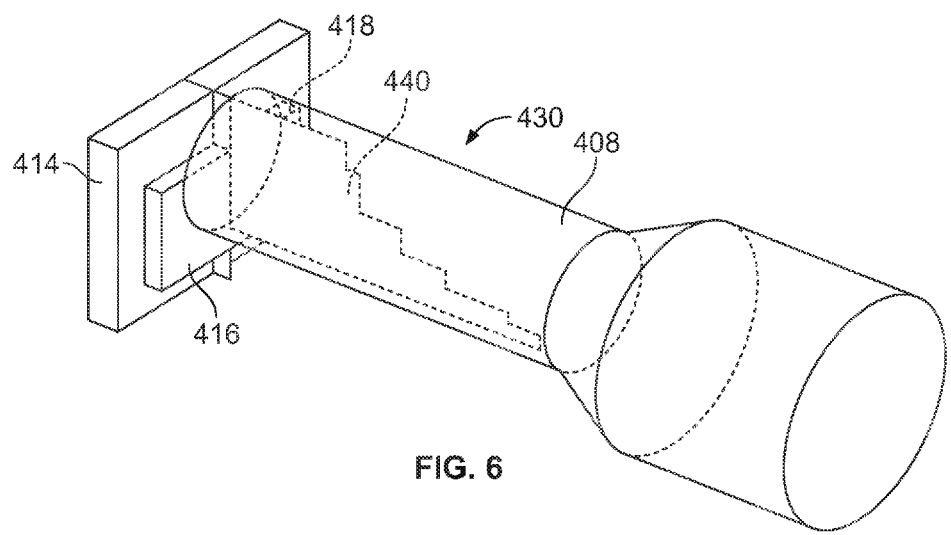
FIG. 6 illustrates a first module and a second module of the contactless connector shown in FIG. 5.

FIG. 5 illustrates another contactless connector 400 formed in accordance with an exemplary embodiment. The connector 400 includes a first module 402 and a second module 404 that provides contactless data transmission at short range using RF energy. FIG. 6 illustrates the first module 402 and the second module 404 may be similar and include similar components. A propagation path is defined between the first and second modules 402, 404 and provides a defined transmission path for the RF energy between the first and second modules 402, 404. In an exemplary embodiment, the propagation path includes a waveguide structure 406 that guides the RF energy along a predetermined path between the first and second modules 402, 404. The waveguide structure 406 may extend along only part of the path between the first and second modules 402, 404. The waveguide structure 406 may be any type of propagation path, including an air gap between the first and second modules 402, 404.

In the illustrated embodiment, the waveguide structure 406 is defined by a first waveguide 408 and a second waveguide 410 separated by an air gap 412. The first and second waveguides 408, 410 are aligned. The first and second waveguides 408, 410 allow relative rotation and/or linear translation therebetween.

In an exemplary embodiment, the first module 402 defines a transmitter (and/or a receiver) and the second module 404 defines a receiver (and/or a transmitter) for receiving the RF energy emitted by the transmitter. Optionally, the first module 402 may define both a transmitter and a receiver and the second module 404 may define both a transmitter and a receiver. The first and second modules 402, 404 may allow single directional communication or may allow bi-directional communication.

As shown in FIG. 6, the first module 402 includes a circuit board 414 having a first communication chip 416 that emits RF signals and a second communication chip 418. The communication chips 416, 418 may define a transmitter chip, a receiver chip or a transceiver chip that is able to both transmit and receive. As shown in FIG. 5, the circuit board 414 may be held in a housing 420, such as a metal housing that provides electrical shielding.

The waveguide structure 406 includes a first waveguide module 430 at one end and a second waveguide module 432 at the other end. The first and second waveguide modules 430, 432 direct the RF signals from/to the chips 416, 418 of the first and second modules 402, 404. The waveguide 408 is part of the first waveguide module 430 and the waveguide 410 is part of the second waveguide module 432. The waveguides 408, 410 may provide shielding from interfering signals. The waveguides 408, 410 may be a hollow metal tube, such as a copper tube. The waveguides 408, 410 may be a plastic, ceramic, glass or other body. The waveguides 408, 410 may be cylindrical or may have other shapes in alternative embodiments. The waveguides 408, 410 may extend along a longitudinal axis or may extend along a curved or angled path.

The first waveguide module 430 has one or more passive components 440 between the communication chips 416, 418 and the waveguide 408. In the illustrated embodiment, the passive component 440 is represented by a septum polarizer. The passive component 440 is designed to operate at a particular frequency or frequency range, such as approximately 60 GHz. The passive component 440 is designed to propagate the RF energy in a particular direction and mode. In an exemplary embodiment, the passive component 440 forms different modes so the waveguide structure 406 can pass multiple modes at once. The passive component 440 enhances the communication link between the first and second modules 402, 404.

The second waveguide module 432 has one or more passive components 450 between the communication chips 416, 418 and the waveguide 410. In the illustrated embodiment, the passive component 450 is represented by a septum polarizer. The passive component 450 is designed to operate at a particular frequency or frequency range, such as approximately 60 GHz. The passive component 450 is designed to propagate the RF energy in a particular direction and mode. In an exemplary embodiment, the passive component 450 forms different modes so the waveguide structure 406 can pass multiple modes at once. The passive component 450 enhances the communication link between the first and second modules 402, 404.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A waveguide structure for a contactless connector comprising:
a first waveguide module having a passive component configured to receive a wireless RF transmission from a first communication chip, the passive component conveying a first signal therefrom;
a waveguide having a waveguide body extending between a first end and a second end, the waveguide receiving the first signal from the passive component of the first waveguide module and conveying the first signal to the second end; and
a second waveguide module having a passive component receiving the first signal from the waveguide, the passive component wirelessly conveying the first signal to a second communication chip;
wherein the waveguide has a rotary joint that allows rotary motion between the first communication chip and the second communication chip.

2. The waveguide structure of claim 1, wherein at least one of the passive components enhances the communication link between the first and second communication chips.

3. The waveguide structure of claim 1, wherein at least one of the passive components redirects the RF signal.

4. The waveguide structure of claim 1, wherein at least one of the passive components collects the RF signal.

5. The waveguide structure of claim 1, wherein at least one of the passive components reflects the RF signal in a general direction.

6. The waveguide structure of claim 1, wherein at least one of the passive components extends the propagation distance of the RF signal.

7. The waveguide structure of claim 1, wherein at least one of the passive components changes the propagation direction of the RF signal.

8. The waveguide structure of claim 1, wherein at least one of the passive components changes the propagation mode of the RF signal.

9. The waveguide structure of claim 1, wherein at least one of the passive components changes the polarization of the RF signal.

10. The waveguide structure of claim 1, wherein at least one of the passive components combines multiple modes of RF signals.

11. The waveguide structure of claim 1, wherein at least one of the passive components shields the RF signal from interfering signals.

12. The waveguide structure of claim 1, wherein the waveguide structure comprises a horn antenna that collects and directs the RF signals.

13. The waveguide structure of claim 1, wherein the waveguide structure comprises a mode converter that changes the propagation mode of the RF signal and/or changes the polarization of the RF signal and/or combines multiple modes of RF signals.

14. The waveguide structure of claim 1, wherein the waveguide structure comprises a horn antenna that collects and directs the RF signals, and a mode converter that changes the propagation mode of the RF signal and/or changes the polarization of the RF signal and/or combines multiple modes of RF signals.

15. The waveguide structure of claim 1, wherein at least one of the passive components redirects the RF signal.

16. The waveguide structure of claim 1, wherein at least one of the passive components collects the RF signal.

17. The waveguide structure of claim 1, wherein at least one of the passive components reflects the RF signal in a general direction.

18. A waveguide structure for a contactless connector comprising:
- a first waveguide module having a passive component configured to receive a wireless RF transmission from a first communication chip, the passive component conveying a first signal therefrom;
- a waveguide having a waveguide body extending between a first end and a second end, the waveguide receiving the first signal from the passive component of the first waveguide module and conveying the first signal to the second end; and
- a second waveguide module having a passive component receiving the first signal from the waveguide, the passive component wirelessly conveying the first signal to a second communication chip;
- wherein at least one of the passive components comprises a horn antenna that collects and directs the RF signals, and at least one of the passive components comprises a mode converter that at least one of changes the propagation mode of the RF signal, changes the polarization of the RF signal, and combines multiple modes of RF signals.

19. The waveguide structure of claim 18, wherein the waveguide has a rotary joint that allows rotary motion between the first communication chip and the second communication chip.

20. A contactless connector comprising:
- a communication module comprising a communication chip generating a RF signal and wirelessly transmitting the RF signal;
- a first waveguide module adjacent the communication chip, the first waveguide module having a passive component receiving the RF signal and conveying the RF signal along a transmission path; and
- a waveguide adjacent the first waveguide module, the waveguide receiving the RF signal and conveying the RF signal along the waveguide remote from the first waveguide module to a second communication chip, wherein the waveguide has a rotary joint that allows rotary motion between a first end proximate to the first communication chip and a second end proximate to the second communication chip.

* * * * *